US010154168B2

United States Patent
Nakatani

(10) Patent No.: US 10,154,168 B2
(45) Date of Patent: Dec. 11, 2018

(54) INFORMATION PROCESSING APPARATUS AND METHOD

(71) Applicant: Yasuhito Nakatani, Kanagawa (JP)

(72) Inventor: Yasuhito Nakatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/455,843

(22) Filed: Mar. 10, 2017

(65) Prior Publication Data

US 2017/0272604 A1 Sep. 21, 2017

(30) Foreign Application Priority Data

Mar. 15, 2016 (JP) .................................. 2016-051685

(51) Int. Cl.
*H04N 1/32* (2006.01)
*H04N 1/00* (2006.01)
*G06F 3/12* (2006.01)
*H04N 1/21* (2006.01)

(52) U.S. Cl.
CPC ....... *H04N 1/32448* (2013.01); *G06F 3/1212* (2013.01); *G06F 3/1275* (2013.01); *G06F 3/1279* (2013.01); *H04N 1/00411* (2013.01); *H04N 1/2166* (2013.01); *H04N 2201/0094* (2013.01)

(58) Field of Classification Search
CPC ........... H04N 1/32448; H04N 1/00411; H04N 1/2166; H04N 2201/0094; G06F 3/1212; G06F 3/1275; G06F 3/1279
USPC ........................................................ 358/1.16
See application file for complete search history.

(56) References Cited

U.S. PATENT DOCUMENTS

| | | | |
|---|---|---|---|
| 2009/0153610 A1* | 6/2009 | Kosugi | B41J 2/17546 347/19 |
| 2009/0234979 A1* | 9/2009 | Hamasaki | G06F 3/0605 710/16 |
| 2012/0086968 A1* | 4/2012 | Saito | G06F 3/122 358/1.13 |
| 2012/0200895 A1* | 8/2012 | Haga | G06K 15/1861 358/1.16 |
| 2012/0203938 A1* | 8/2012 | Nakajima | H04N 1/00127 710/19 |
| 2012/0274665 A1* | 11/2012 | Shimizu | G06F 3/0485 345/684 |

(Continued)

FOREIGN PATENT DOCUMENTS

JP 2009-223699 10/2009

*Primary Examiner* — Allen H Nguyen
(74) *Attorney, Agent, or Firm* — Harness, Dickey & Pierce P.L.C.

(57) ABSTRACT

An information processing apparatus includes an operation unit, a controller unit, and an external device controller, and a management unit. The external device controller is configured to control connection, writing, and reading of an external memory device. The management unit is configured to manage a mount state and unmount state of the external memory device. The mount state is a state in which the external memory device becomes available when the operation unit or the controller unit recognizes the external memory device. The unmount state is a state in which the mount state is released. The management unit is configured to execute an unmount process depending on the mount state when an unmount request of the external memory device is issued.

20 Claims, 15 Drawing Sheets

(56) References Cited

U.S. PATENT DOCUMENTS

2013/0250323 A1* 9/2013 Wakasa ............. G06K 15/1809
358/1.11
2014/0325526 A1* 10/2014 Nagata ..................... G06F 8/34
719/312

* cited by examiner

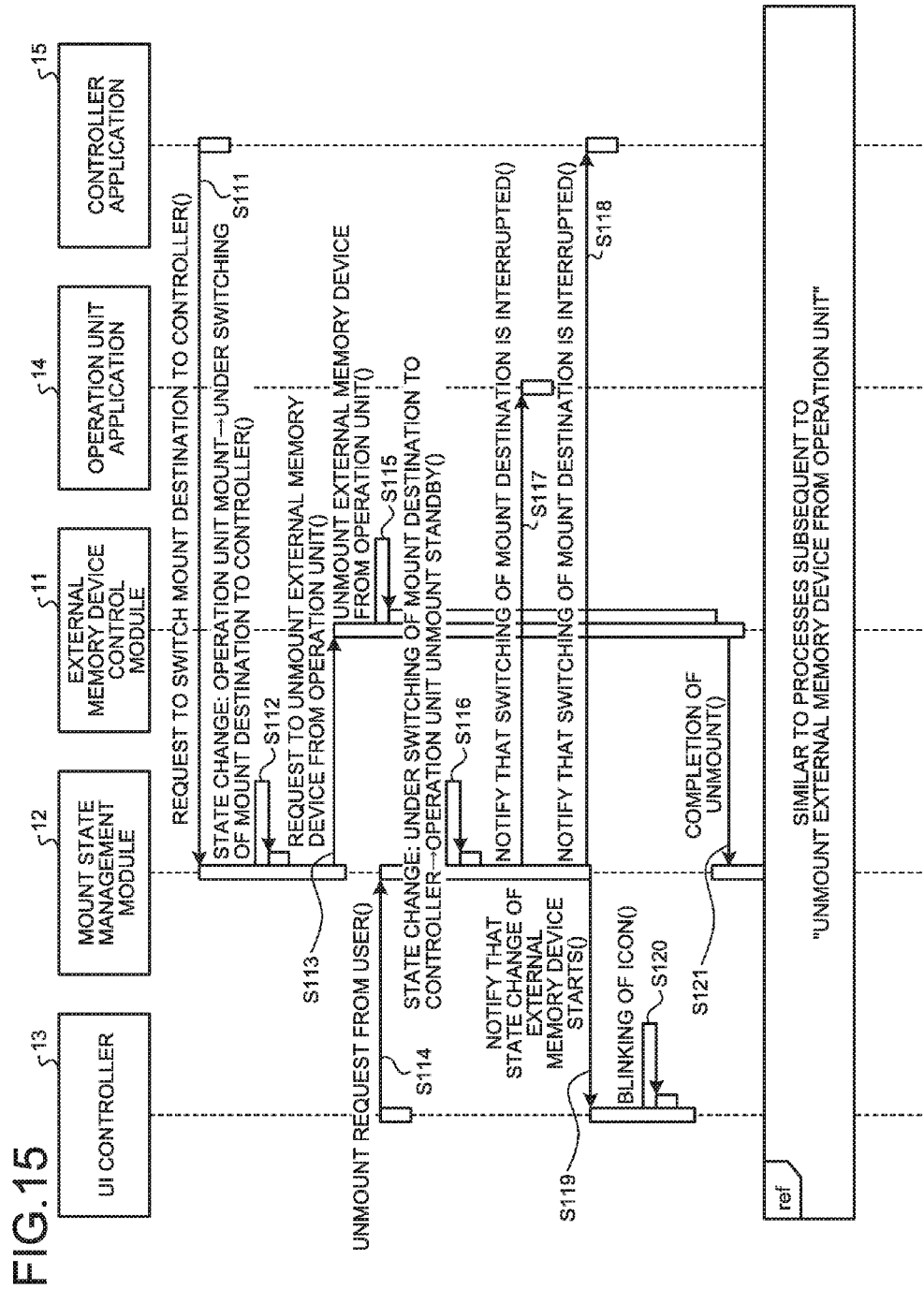

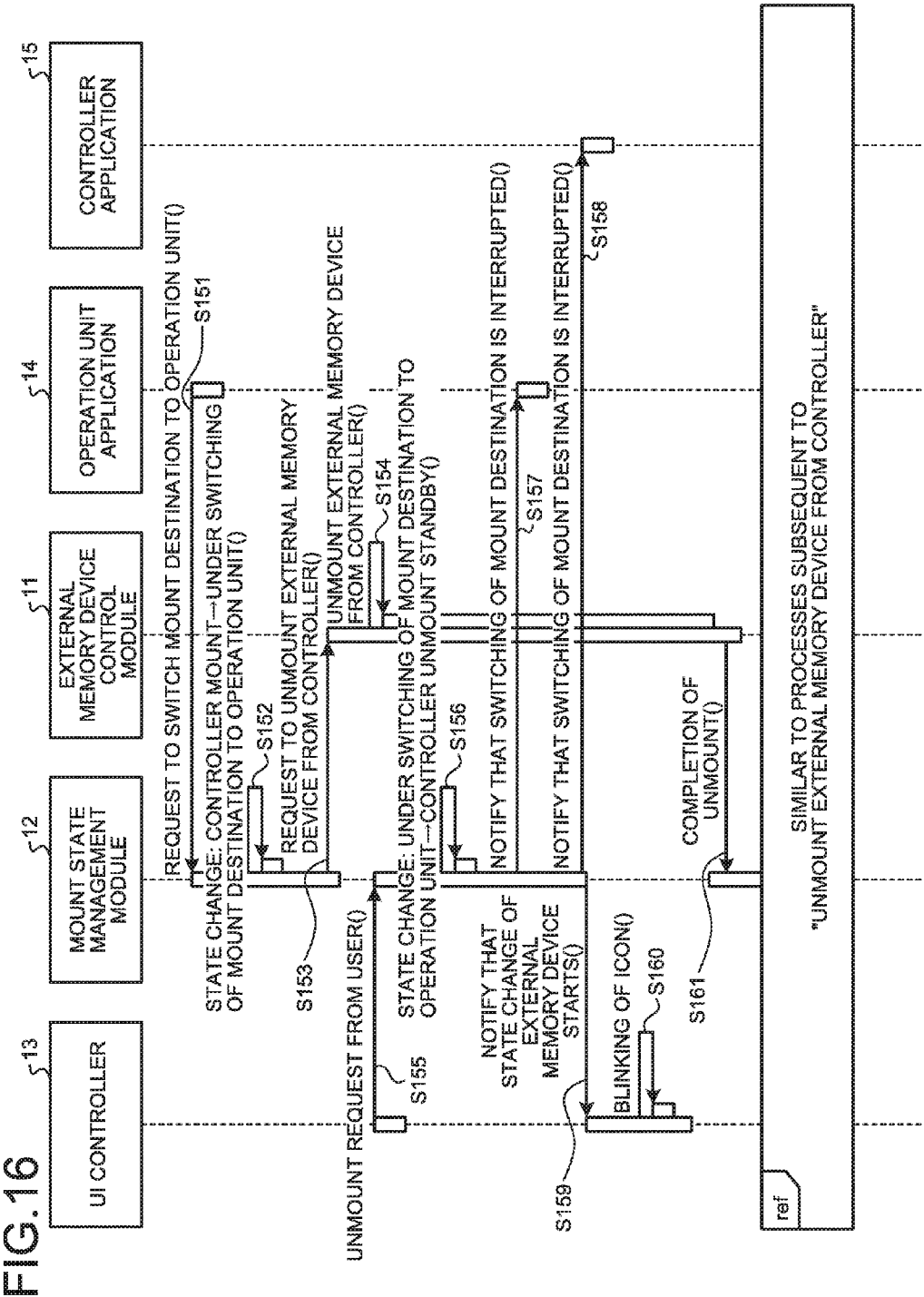

INFORMATION PROCESSING APPARATUS AND METHOD

CROSS-REFERENCE TO RELATED APPLICATIONS

The present application claims priority under 35 U.S.C. § 119 to Japanese Patent Application No. 2016-051685, filed on Mar. 15, 2016. The contents of which are incorporated herein by reference in their entirety.

BACKGROUND OF THE INVENTION

1. Field of the Invention

The present invention relates to an information processing apparatus and method.

2. Description of the Related Art

In recent days, there is known an image processing device such as a multifunction peripheral (MFP) capable of independently operating an operation unit that provides a user interface by removing it from a main body (controller unit). In such an image processing device, the operation unit and the controller unit can be installed with different operating systems (OS) and can be independently operated. As a result, the operation unit can be operated regardless of a state of the controller unit. Therefore, it is possible to obtain an excellent operational response.

Here, in order to allow a user to treat image data and the like using the image processing device, for example, the operation unit is provided with an installation port for an external memory device such as a universal serial bus (USB) memory or an SD card (registered trademark). If the operation unit and the controller unit are allowed to independently operate, it is necessary to allow both the operation unit and the controller unit to read or write the data of the external memory device. In this case, a mount destination (connection destination) of the external memory device is switched between the operation unit and the controller unit in response to a request from an application or the like. As a result, the external memory device can be shared between the operation unit and the controller unit.

However, in a system in which the external memory device is shared between a plurality of working units such as the operation unit and the controller unit, a timing for unmounting (disconnecting) the external memory device is not considered. Therefore, it is difficult to perform the unmount process at the timing that a user desires to remove (uninstall) the external memory device. If the external memory device is removed before the unmount process of the mounted external memory device is completed, the system may fail to store the data in the external memory device, or the data may become imperfect disadvantageously.

SUMMARY OF THE INVENTION

According to one aspect of the present invention, an information processing apparatus includes an operation unit, a controller unit, and an external device controller, and a management unit. The external device controller is configured to control connection, writing, and reading of an external memory device. The management unit is configured to manage a mount state and unmount state of the external memory device. The mount state is a state in which the external memory device becomes available when the operation unit or the controller unit recognizes the external memory device. The unmount state is a state in which the mount state is released. The management unit is configured to execute an unmount process depending on the mount state when an unmount request of the external memory device is issued.

BRIEF DESCRIPTION OF THE DRAWINGS

FIG. 15 is a sequence diagram illustrating the operation executed in response to an unmount request from a user while the external memory device is unmounted from the operation unit in response to a request to switch the mount destination of the external memory device mounted in the operation unit to the controller unit; and FIG. 16 is a sequence diagram illustrating the operation executed in response to an unmount request from a user while the external memory device is unmounted from the controller unit in response to a request to switch the mount destination of the external memory device mounted in the controller unit to the operation unit.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
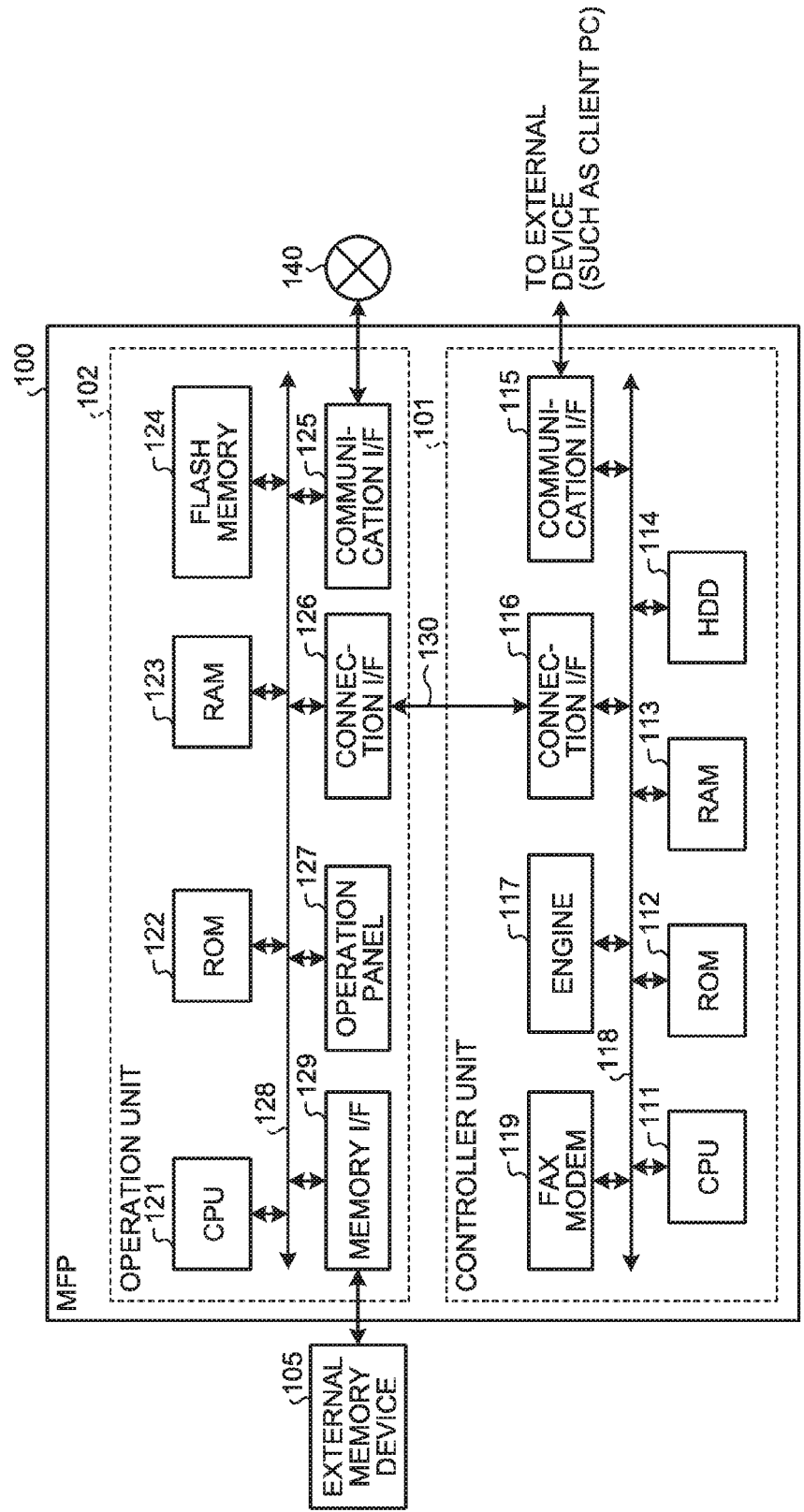
FIG. 1 is a diagram illustrating a hardware configuration of an multifunction peripheral (MFP) according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an information processing apparatus and method capable of safely removing an external memory device shared between a plurality of working units by performing an unmount process at the timing that the external memory device is removed.

A multifunction peripheral (MFP) according to embodiments of the present invention will now be described in details with reference to the accompanying drawings.

First Embodiment

Hardware Configuration of MFP

First, FIG. 1 is a block diagram illustrating a hardware configuration of a multifunction peripheral (MFP) 100 according to the first embodiment. The MFP 100 is an exemplary image processing device. As illustrated in FIG. 1, the MFP 100 includes a controller unit 101 having various functions of devices such as a copy machine, a scanner, a facsimile, and a printer, and an operation unit 102 configured to receive an input in response to a user's operation. The controller unit 101 may have one of the image forming functions such as a copier function, a scanner function, a facsimile function, and a printer function or may have a plurality of such functions.

The controller unit 101 and the operation unit 102 are communicably connected to each other through a dedicated communication path 130. The communication path 130 may be established, for example, using a universal serial bus (USB) cable. Alternatively, the communication path 130 may be established in a wired or wireless manner or using any communication scheme.

The operation unit 102 may include an electronic device capable of independently and perfectly processing information. For example, the operation unit 102 may include an information processing terminal such as a smart phone or a tablet type terminal. In this case, the information processing terminal used as the operation unit 102 also serves as the operation unit of the MFP 100.

More specifically, the information processing terminal used as the operation unit 102 is installably or removably connected to the MFP 100 unlike an operation panel of the prior art fixedly installed as an operation unit dedicated to the MFP 100. If the operation unit 102 is removed from the controller unit 101, the operation unit 102 serves as an operation unit of the MFP 100 by performing radio communication with the controller unit 101, for example, using a Bluetooth (registered trademark) scheme or an infrared ray communication scheme.

The controller unit 101 performs operations in response to an input received by the operation unit 102. In addition, the controller unit 101 can communicate with an external device such as a client personal computer (PC) and also performs operations in response to an instruction received from the external device.

Hardware Configuration of Main Body

Next, a hardware configuration of the controller unit 101 will be described. As illustrated in FIG. 1, the controller unit 101 has a CPU 111, a ROM 112, a RAM 113, and a hard disk drive (HDD) 114. In addition, the controller unit 101 has a communication interface (I/F) 115, a connection I/F 116, an engine 117, and a facsimile modem (FAX modem) 119. Each part 111 to 117 and the FAX modem 119 are connected to each other through a system bus 118.

The CPU 111 consolidatedly controls operations of the controller unit 101. The CPU 111 executes programs stored in the ROM 112 or the HDD 114 by using the RAM 113 as a work area in order to implement various functions of devices such as a copier, a scanner, a facsimile, and a printer as described above by controlling the overall operations of the controller unit 101.

The communication I/F 115 is an interface for communication with an external device such as a client PC, a Web server, or an authentication server on the network 40. The connection I/F 116 is an interface for communication with the operation unit 102 through the communication path 130. Note that the communication path 130 is illustrated as a wired line in FIG. 1. However, when the operation unit 102 is installed in the controller unit 101, the communication path 130 serves as a wired communication path. When the operation unit 102 is removed from the controller unit 101, the communication path 130 serves as a radio communication path.

The engine 117 and the FAX modem 119 is hardware for implementing a copier function, a scanner function, a facsimile function, and a printer function. The engine 117 includes, for example, a scanner for scanning and reading an image on an original document, a plotter for performing print on a sheet material such as paper, a facsimile communication unit for performing facsimile communication, and the like. Furthermore, a particular optional device such as a finisher for sorting the printed sheets and an automatic document feeder (ADF) for automatically feeding the original document may also be provided.

In the MFP 100 according to the first embodiment, software on the OS layer 103 of the controller unit 101 is different from software on the OS layer 203 of the operation unit 102 in order to provide functional independence. That is, the controller unit 101 and the operation unit 102 are operated independently in different operating systems. For example, the Linux (registered trademark) is installed as the software on the OS layer 103 of the controller unit 101, and the Android (registered trademark) is installed as the software on the OS layer 203 of the operation unit 102.

Since the controller unit 101 and the operation unit 102 are operated on different operating systems, communication between the controller unit 101 and the operation unit 102 is performed as communication between different devices rather than communication between processes in the same device. This communication is performed in an operation for transmitting the input received by the operation unit 102 (an instruction from a user) to the controller unit 101 (command communication) or an operation for notifying the operation unit 102 of an event from the controller unit 101.

In the MFP 100 according to the first embodiment, the operation unit 102 is supplied with power through the communication path 130. For this reason, the power of the operation unit 102 can be controlled independently from the power of the controller unit 101. If the operation unit 102 is removable from the controller unit 101, the power supplied from the controller unit 101 through the communication path 130 is stored in a secondary battery. The operation unit 102 is operated using the power stored in the secondary battery and communicates with the controller unit 101 when the operation unit 102 is removed from the controller unit 101.

Note that, although the controller unit 101 and the operation unit 102 are electrically and physically connected to each other through the communication path 130 in this example, the operation unit 102 may be removed from the controller unit 101 as described above. In this case, the controller unit 101 and the operation unit 102 perform communication using a near-field radio communication scheme such as infrared ray communication, RF communication, and Bluetooth (registered trademark) communication. RF is an abbreviation of "radio frequency". Alternatively, the controller unit 101 and the operation unit 102 perform communication using a wireless LAN communication scheme such as the Wi-Fi (registered trademark).

Hardware Configuration of Operation Unit

Next, a hardware configuration of the operation unit 102 will be described. As illustrated in FIG. 1, the operation unit 102 includes a CPU 121, a ROM 122, a RAM 123, a flash memory 124, a communication I/F 125, a connection I/F 126, an operation panel 127, and a memory interface (memory I/F) 129 connected to each other through a system bus 128.

The CPU 121 generally controls the operation of the operation unit 102. The CPU 121 executes a program stored in the ROM 122 or the like by using the RAM 123 as a work area to control the overall operations of the operation unit 102.

The communication I/F 125 is an interface for communication with an external device such as a server on the network 140. The connection I/F 126 is an interface for communication with the controller unit 101 through the communication path 130.

The operation panel 127 includes a liquid crystal display (LCD) device provided with a touch sensor. The operation panel 127 receives various types of input in response to a user's operation and displays various information such as information corresponding to the received input, information indicating an operation status of the MFP 100 or information indicating a setting condition. Note that the operation panel 127 may include an organic electroluminescence (EL) display device provided with a touch sensor. In addition to or instead of this configuration, the operation panel 127 may include an operation unit such as hardware keys or a display unit such as a light-emitting unit.

The memory I/F 129 is installed with an external memory device 105 such as a USB memory or an SD (registered trademark) card where predetermined information such as print data shared by the controller unit 101 and the operation unit 102 is stored. If a USB memory is used as the external memory device 105, a USB terminal corresponds to the memory I/F 129. In contrast, if an SD card (registered trademark) is used as the external memory device 105, a reader/writer unit capable of reading and writing information to and from the SD card (registered trademark) corresponds to the memory I/F 129.

Software Configuration

Figure 2:
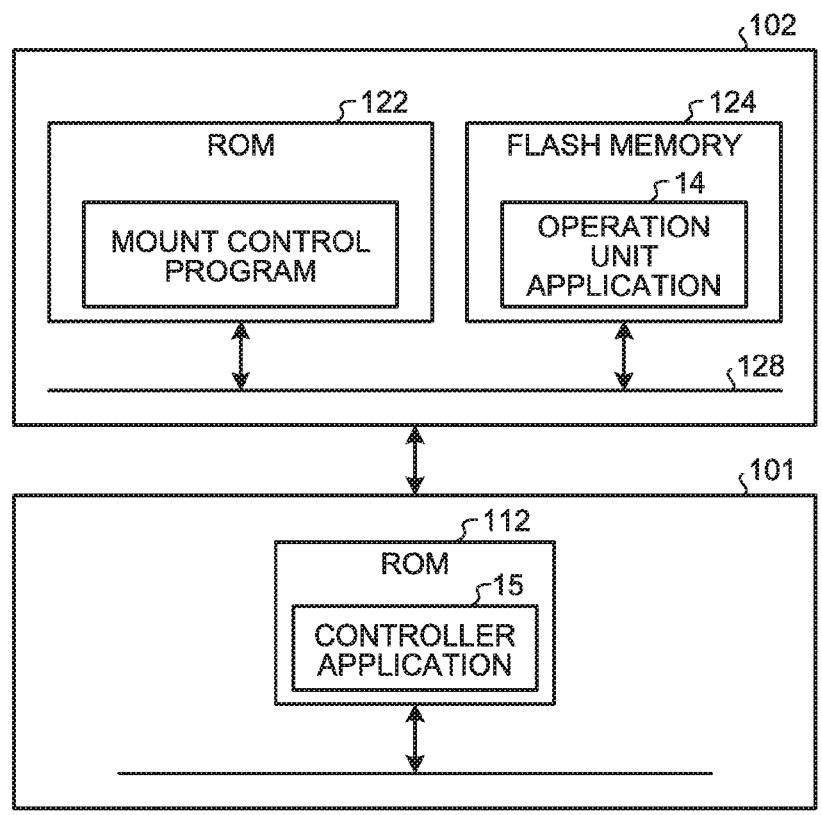
FIG. 2 is a diagram illustrating software programs installed in the MFP.

By way of example, as illustrated in FIG. 2, application programs (controller applications) 15 of the controller unit 101 are stored in the ROM 112 of the controller unit 101 of the MFP 100. In addition, the flash memory 124 of the operation unit 102 of the MFP 100 stores application programs 14 of the operation unit (operation unit applications), and the ROM 122 stores a mount control program for controlling mount and unmount processes of the external memory device 105 for the operation unit 102 and the controller unit 101.

Functional Block Configuration of Operation Unit

Figure 3:
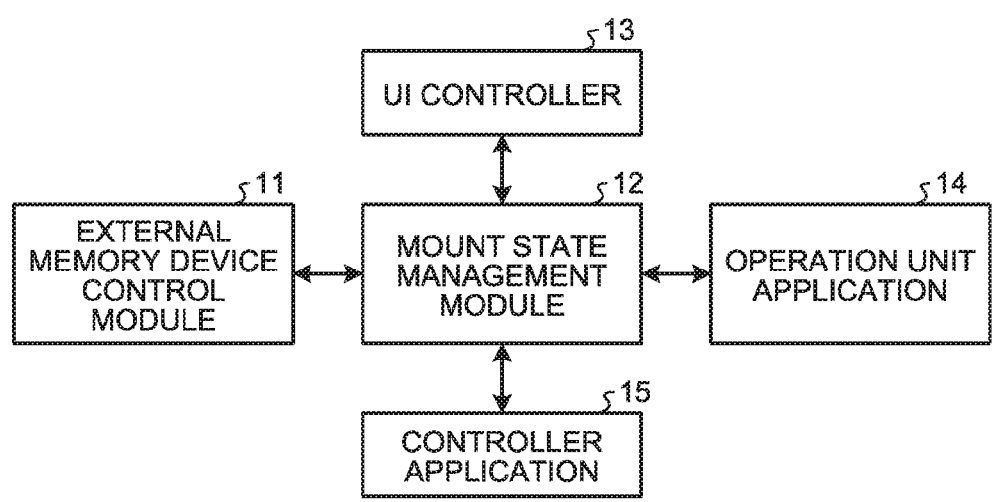
FIG. 3 is a functional block diagram illustrating each function implemented by executing a mount control program.

Next, FIG. 3 is a functional block diagram illustrating various functions implemented when the CPU 121 of the operation unit 102 executes the mount control program stored in the ROM 122. As illustrated in FIG. 3, the CPU 121 serves as an external memory device control module 11 (exemplary external device controller), a mount state management module 12 (exemplary management unit), and a user interface controller (UI controller) 13 by executing the mount control program.

The external memory device control module 11 performs a connection control of the external memory device 105 installed in the memory I/F 129, a data read/write control, and the like. The mount state management module 12 manages a mount state in which the external memory device 105 becomes available and an unmount state in which the mount state is released as the operation unit 102 or the controller unit 101 recognizes the external memory device 105. In addition, the mount state management module 12 executes the unmount process depending on the mount state in response to an unmount request of the external memory device 105. The UI controller 13 displays, on the operation panel 127 of the operation unit 102, a first indication for indicating that the external memory device 105 is mounted in the operation unit 102 or the controller unit 101, a second indication for indicating that the external memory device 105 is under the mount process, a third indication for indicating that the external memory device 105 is under the unmount process, and the like.

These elements including the external memory device control module 11 to the UI controller 13 may be partly or entirely implemented as hardware such as an integrated circuit (IC). In addition, the mount control program may be recorded in a computer readable recording medium such as compact disc read-only memory (CD-ROM) or a flexible disk (FD) as a file having an installable format or an executable format and provided. Alternatively, the mount control program may be recorded in a computer readable recording medium such as a CD-R, a digital versatile disk (DVD), a Blu-ray disc (registered trademark), and a semiconductor memory and provided. Alternatively, the mount control program may be provided in a format installable via a network such as the Internet. Alternatively, the mount control program may be integrated into a device ROM and the like in advance and provided.

Figure 4:
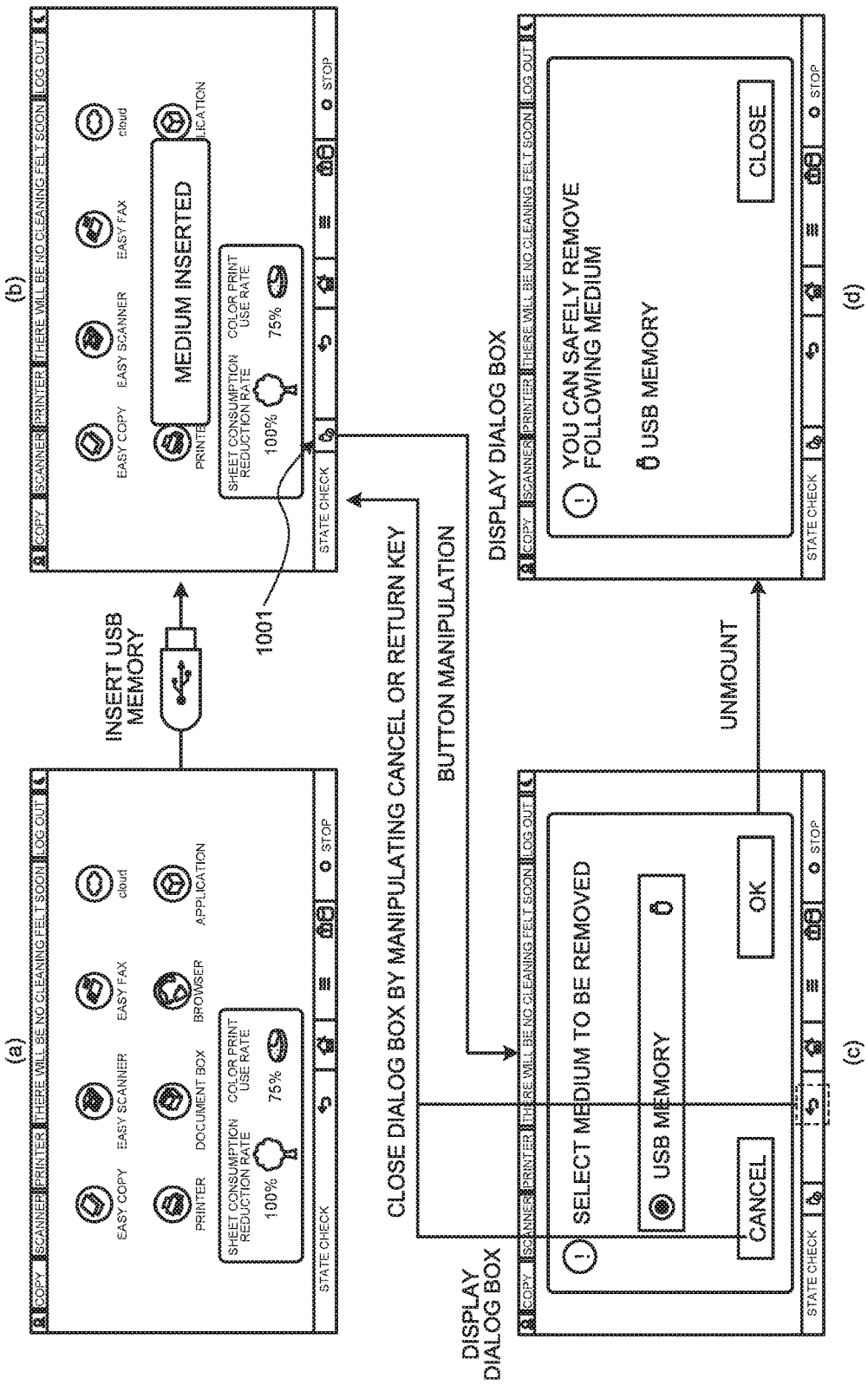
FIG. 4 is a diagram illustrating exemplary display screens displayed when a semiconductor memory is mounted or unmounted.

Examples of Display Screens Corresponding to Mount and Unmount of External Memory Device FIG. 4 is a diagram illustrating exemplary display screens corresponding to the mount and unmount states of the external memory device 105. (a) of FIG. 4 illustrates an initial screen of the operation panel 127 where various icons serving as operation menus are displayed under control of the UI controller 13. In this state, if a user installs the external memory device 105 such as a USB memory in the memory I/F 129, the mount process is executed. The UI controller 13 displays the icon 1001 by blinking while the external memory device 105 is mounted (second indication).

If the mount process is completed, the UI controller 13 displays, on the operation panel 127, a message indicating a fact that the mount is completed, such as "MEDIUM INSERTED" as illustrated in (b) of FIG. 4. In addition, if the mount is completed, the UI controller 13 displays an icon 1001 that portraits appearance of the external memory device 105, for example, in a lower bar area of the operation panel 127 as illustrated in (b) of FIG. 4. The UI controller 13 displays the icon 1001 by lighting if the external memory device 105 is available (first indication).

From the user's viewpoint, the MFP 100 is just a single system. Therefore, if a mount destination of the external memory device 105 is internally switched between the operation unit 102 and the controller unit 101, an unmount process or a mount process is generated. However, in this case, the UI controller 13 remains the icon 1001 to light without blinking.

If a user operates the icon 1001 while the icon 1001 has a lighting state, the UI controller 13 displays an unmount device selection screen on the operation panel 127 as illustrated in (c) of FIG. 4. If a plurality of external memory devices are connected to the MFP 100, a user selects an external memory device 105 to be unmounted using this selection screen. If a desired external memory device 105 is selected by a user, the unmount process for the selected external memory device 105 is executed.

The UI controller 13 displays the icon 1001 by blinking while the external memory device 105 is mounted (third indication). Note that, if the icon is displayed by blinking while the external memory device 105 is mounted or unmounted (second indication), a blinking interval of the icon 1001 may be set to be equal between the second and third indications or may be set to be different for distinction purposes.

If the unmount process is completed, the UI controller 13 displays an unmount completion notification on the operation panel 127 using the operation panel 127 as illustrate in (d) of FIG. 4. Note that, if the icon 1001 is operated by a user while the icon 1001 is displayed by blinking (that is, during the mount or unmount process), the CPU 121 of the operation unit 102 cancels an instruction corresponding to this operation.

State Transition of Mount State Management Module

Figure 5:
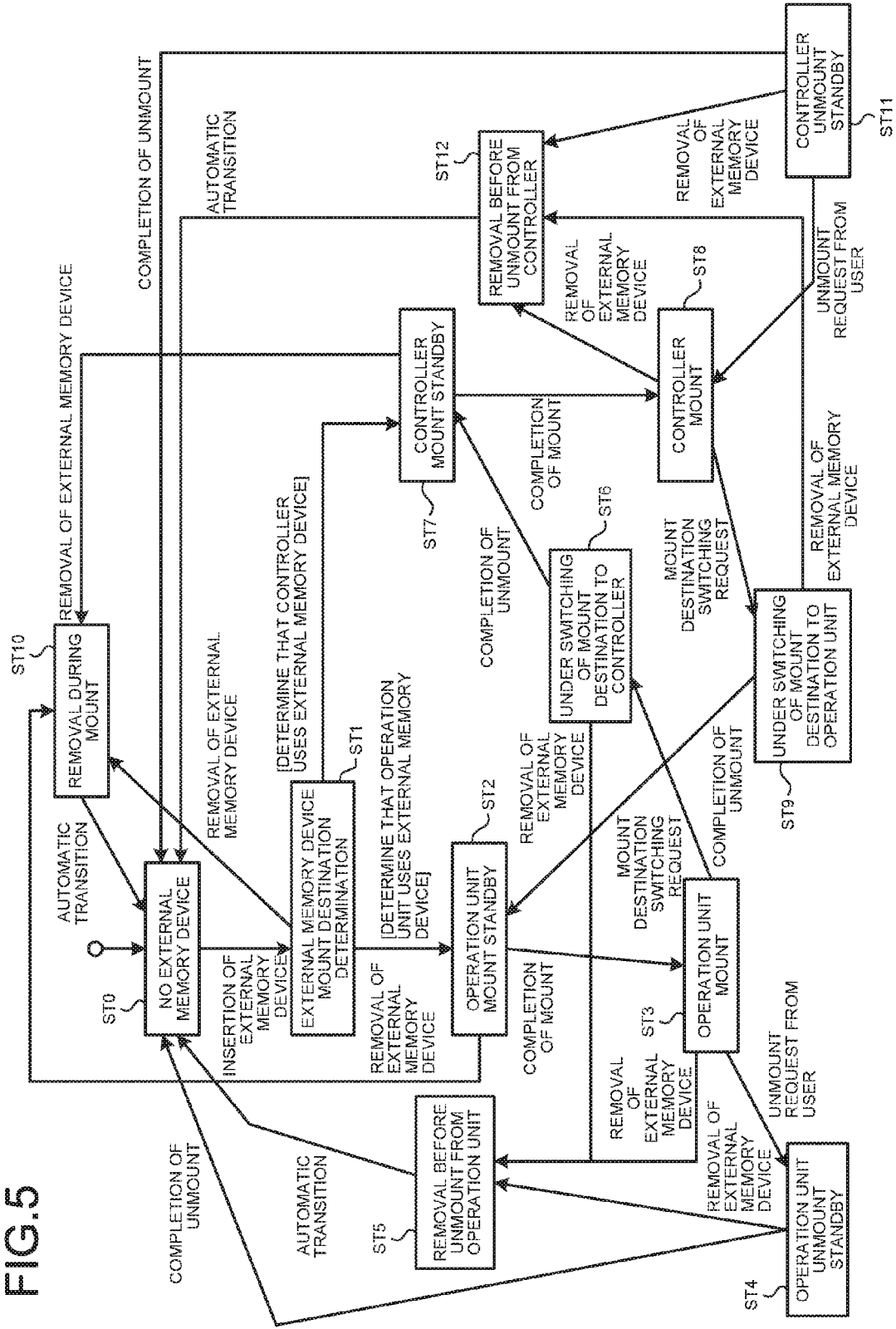
FIG. 5 is a state transition diagram illustrating a mount state management module 12.

FIG. 5 is a state transition diagram of the mount state management module 12. The mount state management module 12 has any one of the states ST of FIG. 5 at all times. The state of the mount state management module 12 transits depending on various events described below. That is, if the external memory device 105 is installed in the memory I/F 129, notice of an "installation event" indicating that the external memory device 105 is installed in the memory I/F 129 is given from the external memory device control module 11 to the mount state management module 12. If the external memory device 105 is removed from the memory I/F 129, notice of a "removal event" indicating that the external memory device 105 is removed from the memory I/F 129 is given from the external memory device control module 11 to the mount state management module 12.

If the mount process for mounting the installed external memory device 105 in the operation unit 102 or the controller unit 101 is completed, notice of a "mount completion event" indicating that the mount process is completed is given from the external memory device control module 11 to the mount state management module 12. If the unmount process for unmounting the installed external memory device 105 from the operation unit 102 or the controller unit 101 is completed, notice of an "unmount completion event" indicating that the unmount process is completed is given from the external memory device control module 11 to the mount state management module 12.

If an operation performed by a user to remove the external memory device 105 from the operation unit 102 is detected, notice of an "unmount request event" indicating that removal of the external memory device 105 is requested is given from the UI controller 13 to the mount state management module 12.

If the external memory device 105 mounted in the controller unit 101 is used by the operation unit application 14, notice of a "switching request event" for requesting switching of the mount destination from the controller unit 101 to the operation unit 102 is given from the operation unit application 14 to the mount state management module 12. In addition, if the external memory device 105 mounted in the operation unit 102 is used by the controller application 15, notice of a "switching request event" for requesting switching of the mount destination from the operation unit 102 to the controller unit 101 is given from the operation unit application 14 to the mount state management module 12.

When the state transition occurs, the mount state management module 12 performs an entry process depending on the changed state as described below. That is, if the external memory device 105 is installed in the state (ST0) in which the external memory device 105 is not installed in the memory I/F 129, the mount state management module 12 transits to an "external memory device mount destination determination" state ST1 for determining the mount destination of the installed external memory device 105. In the state ST1, if the application displayed on the operation unit 102 is the operation unit application 14, the mount state management module 12 determines that the external memory device 105 is used by the operation unit 102 and transits to a "operation unit mount standby" state ST2.

In contrast, if the application displayed on the operation unit 102 is the controller application 15, the mount state management module 12 determines that the external memory device 105 is used by the controller unit 101 and transits to the "controller mount standby" state ST7. In addition, if a user removes the external memory device 105 from the operation unit 102 in the "external memory device mount destination determination" state ST1, the mount state management module 12 transits to a "removal during mount" state ST10 indicating that the external memory device 105 is removed during the mount process.

If the mount state management module 12 transits to the "operation unit mount standby" state ST2, a mount request for mounting the external memory device 105 in the operation unit 102 is issued to the external memory device control module 11. If the mount process for mounting the external memory device 105 in the operation unit 102 is completed by the external memory device control module 11, the mount state management module 12 transits to a "operation unit mount" state ST3 indicating that the external memory device 105 is mounted in the operation unit 102.

If a user makes an operation for requesting removal of the external memory device 105 in the "operation unit mount" state ST3, the mount state management module 12 transits to a "operation unit unmount standby" state ST4 in which the unmount process of the external memory device 105 using the external memory device control module 11 stands by. In addition, if the unmount process of the external memory device 105 using the external memory device control module 11 is completed, and a user removes the external memory device 105 from the operation unit 102, the mount state management module 12 returns to the "no external memory device" state ST0.

Figure 6:
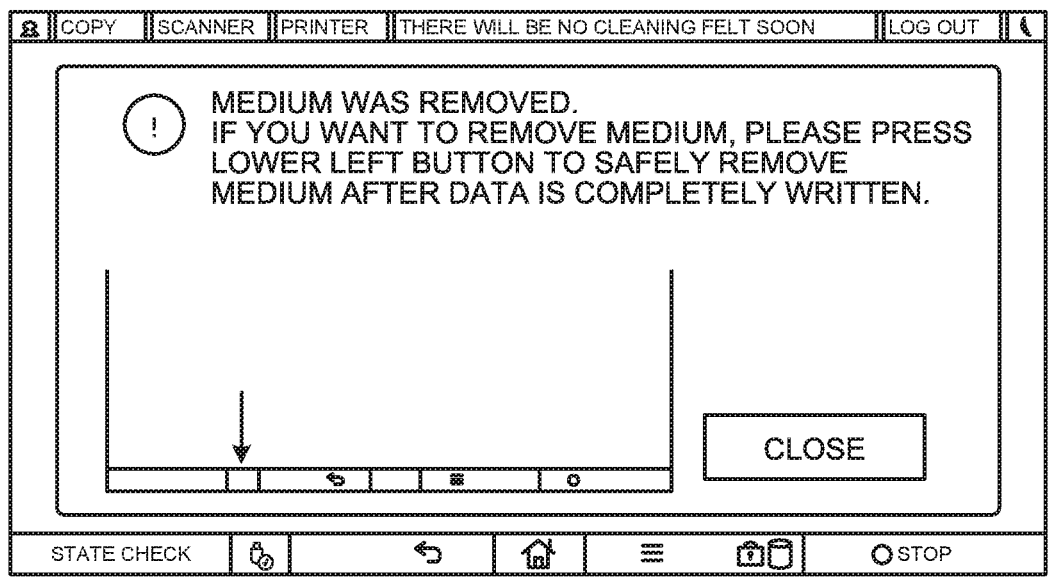
FIG. 6 is a diagram illustrating an exemplary warning screen displayed when an external memory device is removed from an operation unit before an unmount process is completed.

In contrast, if a user removes the external memory device 105 from the operation unit 102 before completion of the unmount process in the "operation unit mount" state ST3 or the "operation unit unmount standby" state ST4, the mount state management module 12 transits to the "removal before unmount from operation unit" state ST5 indicating that the external memory device 105 is removed from the operation unit 102 before completion of the unmount process. The mount state management module 12 that has transited to the "removal before unmount from operation unit" state ST5 automatically returns to "no external memory device" state ST0. However, in this case, the mount state management module 12 requests the UI controller 13 to display a warning. As this warning display request is received, the UI controller 13 displays a warning message such as "if you want to remove medium, please safely remove medium by pressing predetermined button after completing data writing" on the operation panel 127 as illustrated in FIG. 6.

Then, if a user makes a "mount destination switching request" operation, or the "mount destination switching request" is issued from the controller application 15 in the "operation unit mount" state ST3, the mount state management module 12 transits to the "under switching of mount destination to controller" state ST6. If the mount state management module 12 transits to the "under switching of mount destination to controller" state ST6, the unmount process is performed for the external memory device 105 mounted in the operation unit 102. In addition, if the unmount process is completed, the mount state management module 12 transits to the "controller mount standby" state ST7 in which completion of mounting the external memory device 105 to the controller unit 101 stands by. Note that, if the external memory device 105 is removed from the operation unit 102 in the "under switching of mount destination to controller" state ST6, the state of the mount state management module 12 returns to the state ST0 through the state ST5 described above.

If a mount completion notification of the external memory device 105 to the controller unit 101 is received from the external memory device control module 11 in the "controller mount standby" state ST7, the mount state management module 12 transits to the "controller mount" state ST8.

If a user makes a "mount destination switching request" operation, or the "mount destination switching request" is issued from the operation unit application 14 in the "controller mount" state ST8, the mount state management module 12 transits to the "under switching of mount destination to operation unit" state ST9. If the mount state management module 12 transits to the "under switching of mount destination to operation unit" state ST9, the mount state management module 12 performs the unmount process of the external memory device 105 mounted in the controller unit 101. In addition, if the unmount process is completed, the mount state management module 12 transits to the "operation unit mount standby" state ST2 described above. If a user removes the external memory device 105 from the operation unit 102 in the "operation unit mount standby" state ST2, the mount state management module 12 transits to a "removal during mount" state ST10 indicating that the external memory device 105 is removed during the mount process, and controls display of the warning message described above.

Then, if a user makes a removal request operation of the external memory device 105 in the "controller mount" state ST8, the mount state management module 12 transits to the "controller unmount standby" state ST11 in which the unmount process of the external memory device 105 using the external memory device control module 11 stands by. In addition, if the unmount process of the external memory device 105 using the external memory device control module 11 is completed, and a user removes the external memory device 105 from the operation unit 102, the mount state management module 12 returns to the "no external memory device" state ST0.

Then, if a user removes the external memory device 105 from the operation unit 102 in the "controller mount" state ST8, the "under switching of mount destination to operation unit" state ST9, or the "controller unmount standby" state ST11, the mount state management module 12 transits to a "removal before unmount from controller" state ST12. The mount state management module 12 that has transited to the "removal before unmount from controller" state ST12 automatically returns to the "no external memory device" state ST0. However, in this case, a request to display the warning illustrated in FIG. 6 is issued to the UI controller 13.

Mount Process when External Memory Device is Installed

Figure 7:
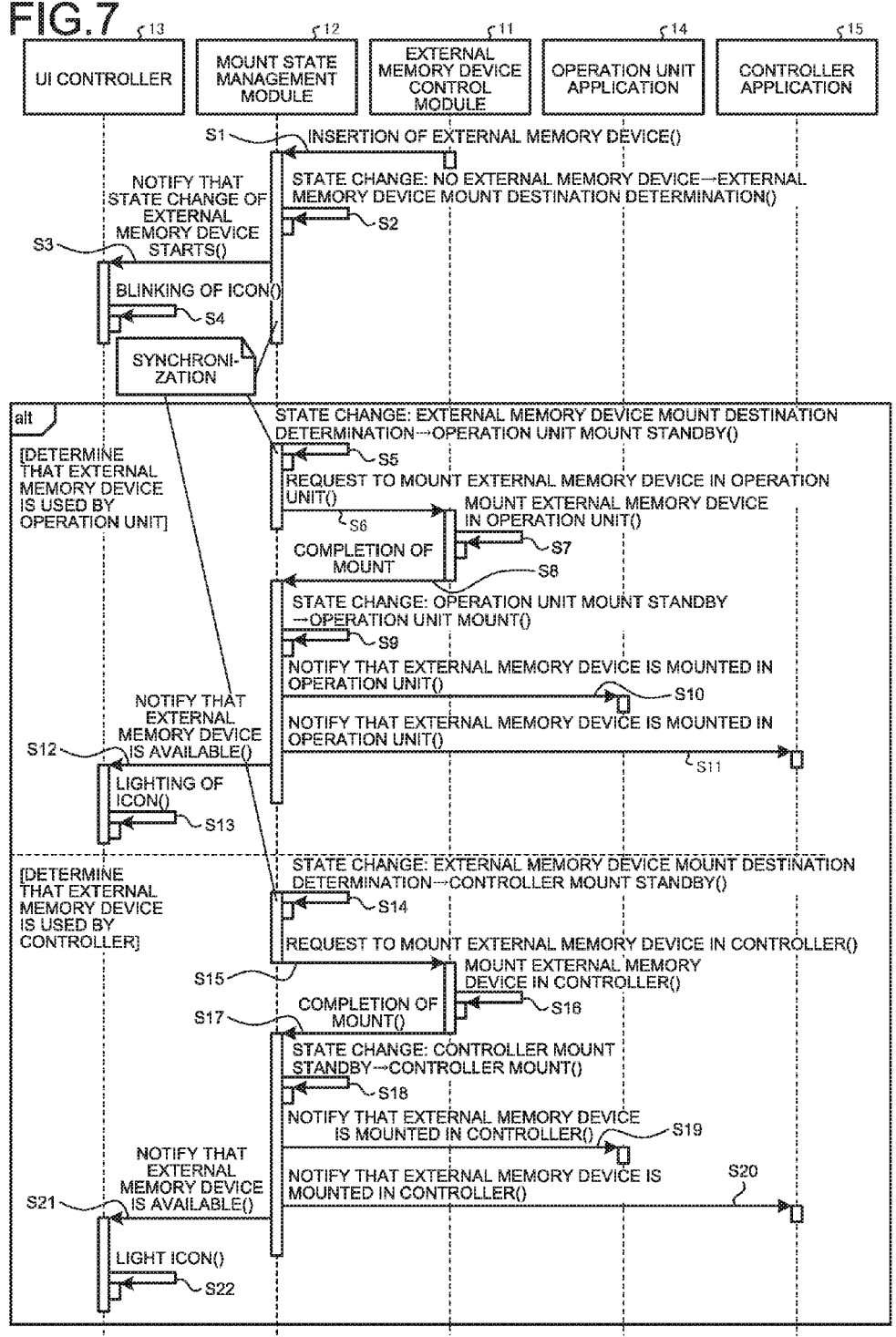
FIG. 7 is a sequence diagram illustrating a flow of a mount process when the external memory device is installed.

Next, FIG. 7 is a sequence diagram illustrating a flow of the mount process when the external memory device 105 is installed. In FIG. 7, if the external memory device is installed (step S1), the mount state management module 12 transits to the "external memory device mount destination determination" state ST1 for determining a mount destination of the external memory device 105 by detecting whether an application that uses the external memory device 105 is the operation unit application 14 or the controller application 15 (step S2).

The mount state management module 12 transmits a state change start notification of the external memory device 105 to the UI controller 13 (step S3). The UI controller 13 notifies a user of a fact that the mount process of the external memory device 105 is under execution by displaying the icon 1001 described in conjunction with (b) of FIG. 4 by blinking (step S4). The mount state management module 12 determines a mount destination of the external memory device. If it is determined that the external memory device is used by the operation unit, the mount state management module 12 transits to the "operation unit mount standby" state ST2. If it is determined that the external memory device is used by the controller, the mount state management module 12 transits to the "controller mount standby" state.

If it is determined that the external memory device 105 is used by the operation unit 102 (step S5), the mount state management module 12 transits to the "operation unit mount standby" state ST2 and then requests the external memory device control module 11 to mount the external memory device 105 in the operation unit 102 (step S6).

The external memory device control module 11 mounts the external memory device in the operation unit 102 (step S7). After completion of the mount process, notice of a mount completion is given from the external memory device control module 11 to the mount state management module 12 (step S8). The mount state management module 12 transits to the "operation unit mount" state ST3 (step S9). In addition, the mount state management module 12 notifies the operation unit application 14 and the controller application 15 of a fact that the external memory device 105 is mounted in the operation unit 102 (steps S10 and S11). In addition, the mount state management module 12 notifies the UI controller 13 of a fact that the external memory device is available (step S12). The UI controller 13 notifies a user of a fact that the external memory device 105 is available by lighting the icon 1001 (step S13).

In contrast, if it is determined that the external memory device 105 is used by the controller unit 101, the mount state management module 12 transits to the "controller mount standby" state ST7 and requests the external memory device control module 11 to mount the external memory device in the controller unit 101 (step S15). The external memory device control module 11 performs the mount process for mounting the external memory device 105 in the controller unit 101 (step S16). If the mount process is completed, the external memory device control module 11 notifies the mount state management module 12 of completion of mount (step S17). As a result, the mount state management module 12 transits to the "controller mount" state ST8 (step S18).

The mount state management module 12 notifies the operation unit application 14 and the controller application 15 of a fact that the external memory device 105 is mounted in the controller unit 101 (steps S19 and S20). In addition, the mount state management module 12 notifies the UI controller 13 of a fact that the external memory device is available (step S21). The UI controller 13 notifies a user of a fact that the external memory device 105 is available by lighting the icon 1001 (step S22).

Unmount Process from "Operation Unit Mount" State

Figure 8:
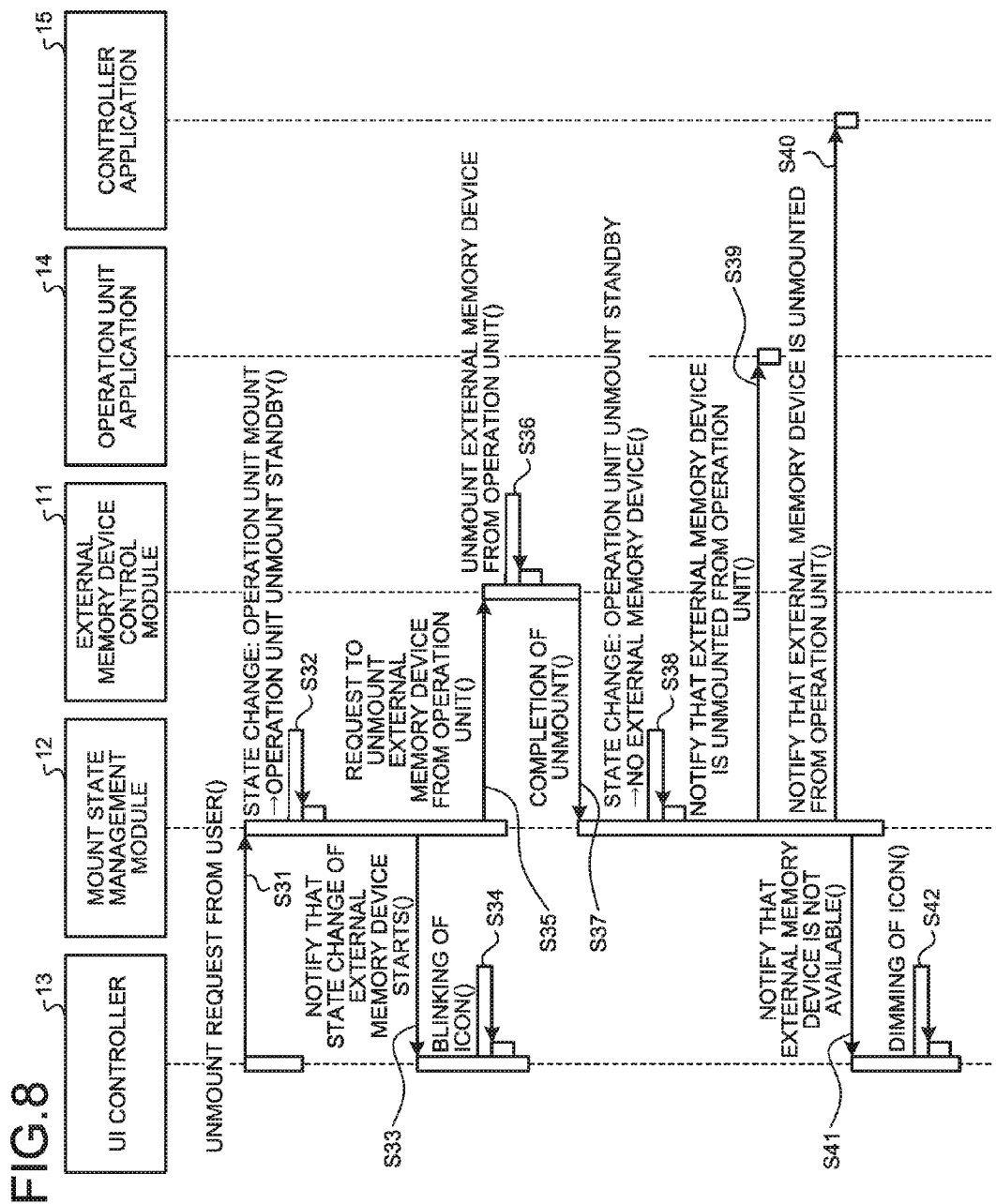
FIG. 8 is a sequence diagram illustrating a flow of the unmount process executed in response to an unmount request in an operation unit mount state in which the external memory device is mounted in the operation unit.

FIG. 8 is a sequence diagram illustrating a flow of the unmount process in response to an unmount request in the "operation unit mount" state ST3 in which the external memory device 105 is mounted in the operation unit 102. In FIG. 8, if a user operates the icon 1001 on the display screen of (b) of FIG. 4 to request unmount of the external memory device 105 installed in the operation unit 102, notice of the unmount request is given from the UI controller 13 to the mount state management module 12 (step S31).

The mount state management module 12 transits to the "operation unit unmount standby" state ST4 (step S32) and requests the external memory device control module 11 to unmount the external memory device 105 from the operation unit 102 (step S35). In addition, the mount state management module 12 notifies the UI controller 13 of a fact that the state change of the external memory device 105 starts (step S33). In response to this state change start notification, the UI controller 13 notifies a user of a fact that the unmount process of the external memory device 105 starts by blinking the icon 1001 (step S34).

Next, if the unmount process is completed by unmounting the external memory device 105 from the operation unit 102 (step S36), the external memory device control module 11 notifies the mount state management module 12 of a fact that the unmount process is completed (step S37). If this unmount completion notification is received, the mount state management module 12 transits to the "no external memory device" state ST0 (step S38).

The mount state management module 12 notifies the operation unit application 14 and the controller application 15 of a fact that the external memory device 105 is unmounted (steps S39 and S40). In addition, the mount state management module 12 transmits a notification for notifying of a fact that the external memory device 105 is not available to the UI controller 13 (step S41). As this notification is received, the UI controller 13 notifies a user of a fact that the external memory device 105 is not available by dimming the icon 1001 (step S42).

Unmount Process from "Controller Mount" State

Figure 9:
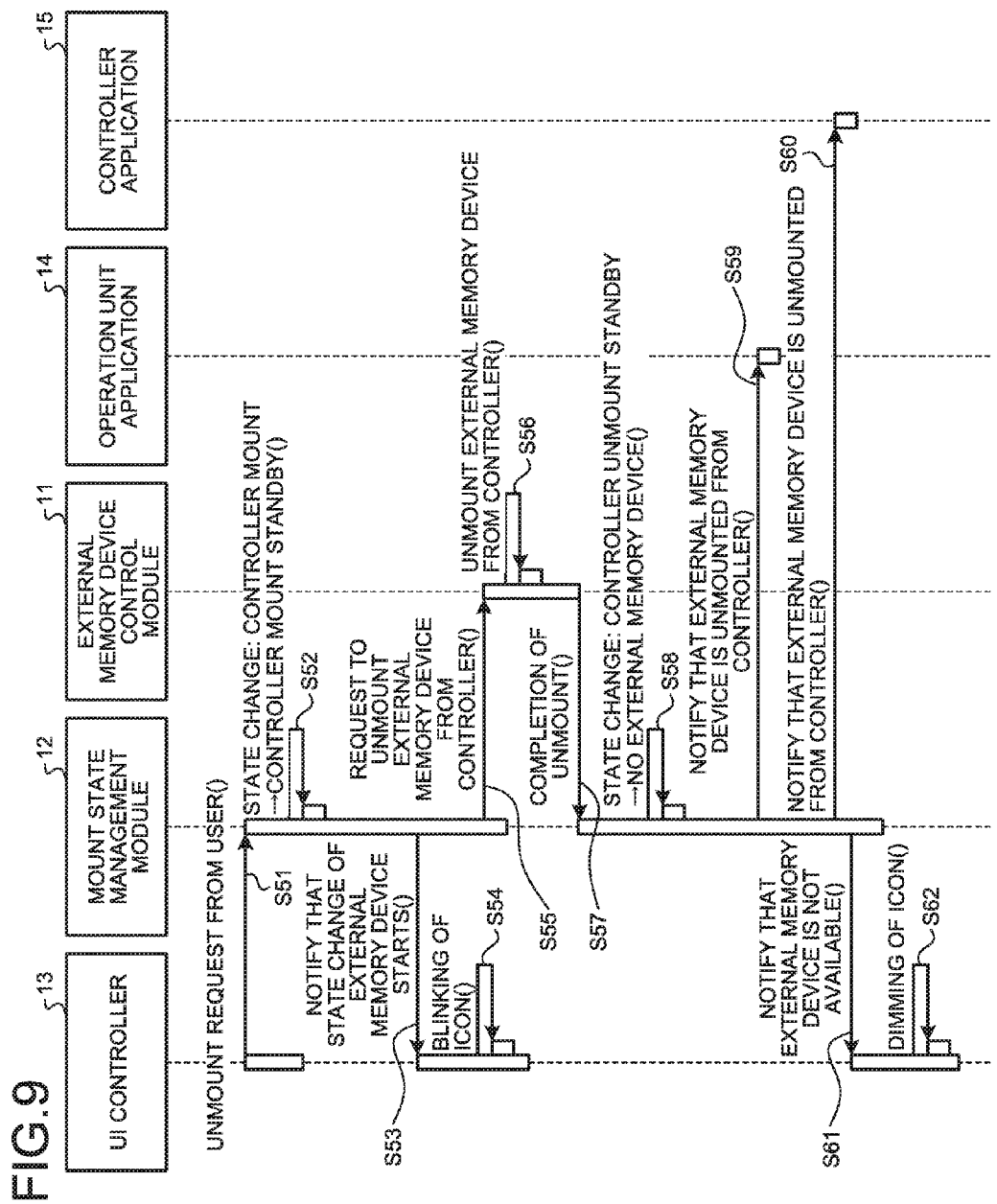
FIG. 9 is a sequence diagram illustrating a flow of the unmount process executed in response to an unmount request in the operation unit mount state in which the external memory device is mounted in a controller unit.

FIG. 9 is a sequence diagram illustrating a flow of the unmount process in response to the unmount request in the controller mount state ST83 in which the external memory device 105 is mounted in the controller unit 101. In FIG. 9, if a user operates the icon 1001 on the display screen of (b) of FIG. 4 to request to unmount the external memory device 105 installed in the controller unit 101, notice of an unmount request is given from the UI controller 13 to the mount state management module 12 (step S51).

The mount state management module 12 transits to the "controller unmount standby" state ST11 (step S52) and requests the external memory device control module 11 to unmount the external memory device 105 from the controller unit 101 (step S55). In addition, the mount state management module 12 notifies the UI controller 13 of a fact that the state change of the external memory device 105 starts (step S53). In response to this state start notification, the UI controller 13 notifies a user of a fact that the unmount process of the external memory device 105 starts by blinking the icon 1001 (step S54).

Then, the external memory device control module 11 performs the unmount process for unmounting the external memory device 105 from the controller unit 101 (step S56). If the unmount process is completed, notice of the unmount completion is given to the mount state management module 12 (step S57). If the unmount completion notification is received, the mount state management module 12 transits to the "no external memory device" state ST0 (step S58).

The mount state management module 12 notifies the operation unit application 14 and the controller application 15 of a fact that the external memory device 105 is unmounted (steps S59 and S60). In addition, the mount state management module 12 transmits a notification for notifying of a fact that the external memory device 105 is not available to the UI controller 13 (step S61). As this notification is received, the UI controller 13 notifies a user of a fact that the external memory device 105 is not available by dimming the icon 1001 (step S62).

Figure 10:
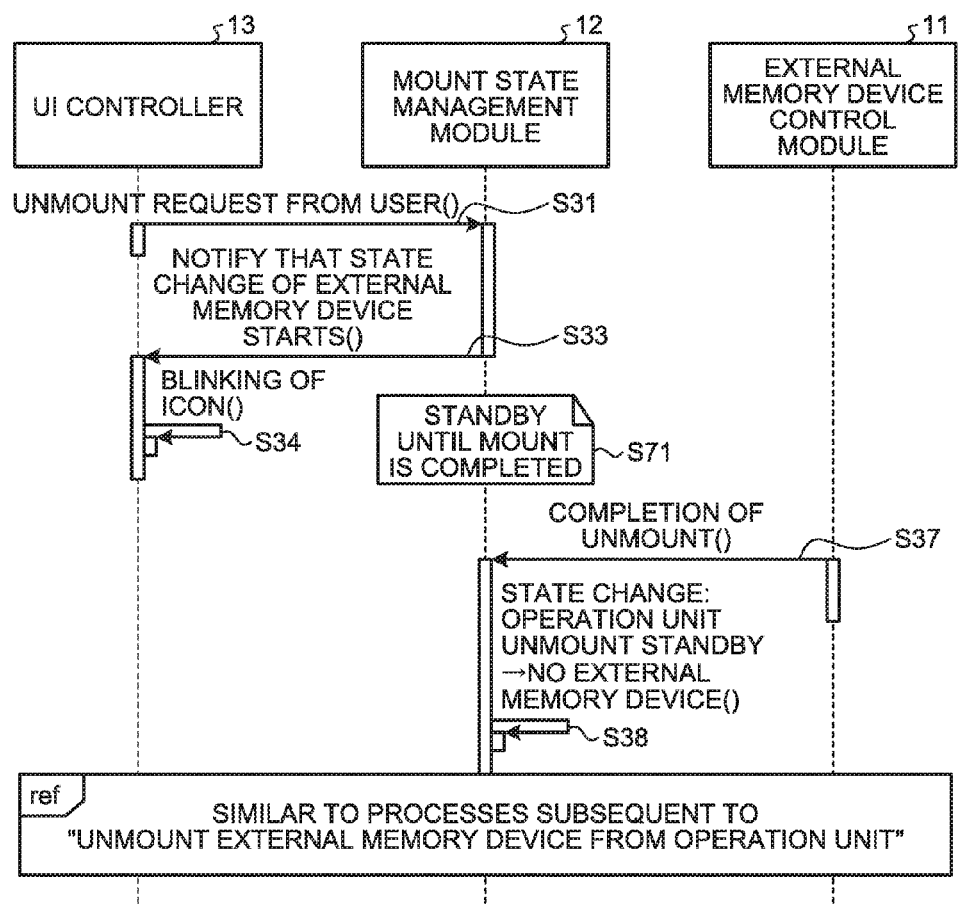
FIG. 10 is a sequence diagram illustrating a flow of the operation executed in response to an unmount request while a state of the mount state management module is in the "under switching of mount destination to operation unit" state or in the "operation unit mount standby" state.

Processing when Unmount Request is Issued During Switching of Mount Destination to Operation Unit or During Mount Standby FIG. 10 is a sequence diagram illustrating a flow of the operation in response to the unmount request when the mount state management module 12 has the "under switching of mount destination to operation unit" state ST9 or the "operation unit mount standby" state ST2. Note that, in FIG. 10, like reference numerals denote like steps as in the sequence diagram of FIG. 8, and they will not be described repeatedly. In this case, as indicated in step S71 of FIG. 10, the mount state management module 12 has a standby state until the external memory device 105 is mounted in the operation unit 102. After the mount process is completed, a sequence for unmounting the external memory device 105 from the operation unit 102 is executed as described above in conjunction with FIG. 8.

However, at the timing that the unmount request is received from a user, notice of a start of the state change of the external memory device 105 is given from the mount state management module 12 to the UI controller 13, and the UI controller 13 performs control to blink the icon 1001. As a result, a user is notified of a fact that the unmount request is received.

Figure 11:
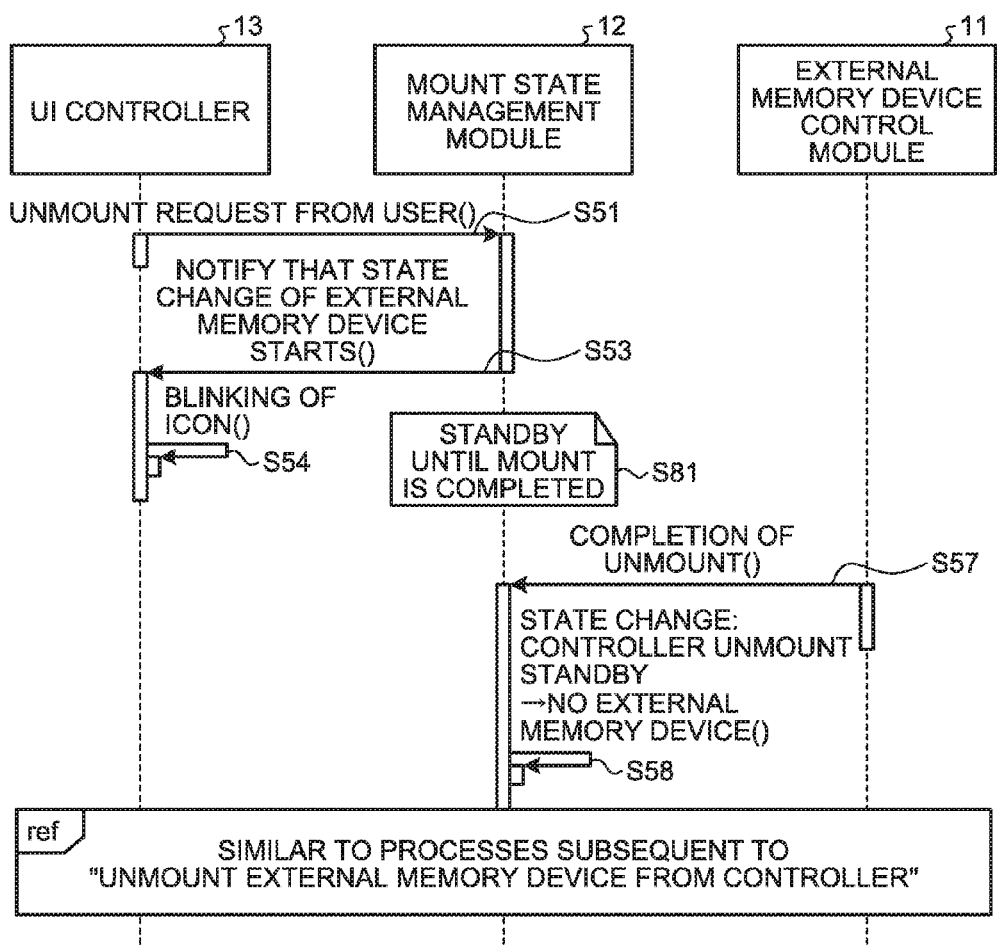
FIG. 11 is a sequence diagram illustrating a flow of the operation executed in response to an unmount request while a state of the mount state management module is in the "under switching of mount destination to controller" state or in the "controller mount standby" state.

Processing when Unmount Request is Issued During Switching of Mount Destination to Controller Unit or During Mount Standby FIG. 11 is a sequence diagram illustrating a flow of the operation in response to the unmount request when the mount state management module 12 has the "under switching of mount destination to controller unit" state ST6 or the "controller mount standby" state ST7. Note that, in FIG. 11, like reference numerals denote like steps as in the sequence diagram of FIG. 9, and they will not be described repeatedly. In this case, as indicated by step S81 of FIG. 11, the mount state management module 12 has a standby state until the mount process for mounting the external memory device 105 in the controller unit 101 is completed. After the mount process is completed, the unmount process for unmounting the external memory device 105 from the controller unit 101 is executed as described above in conjunction with FIG. 9.

However, at the timing that the unmount request is received from a user, notice of a start of the state change of the external memory device 105 is given from the mount state management module 12 to the UI controller 13, and the UI controller 13 performs control to blink the icon 1001. As a result, a user is notified of a fact that the unmount request is received.

Figure 12:
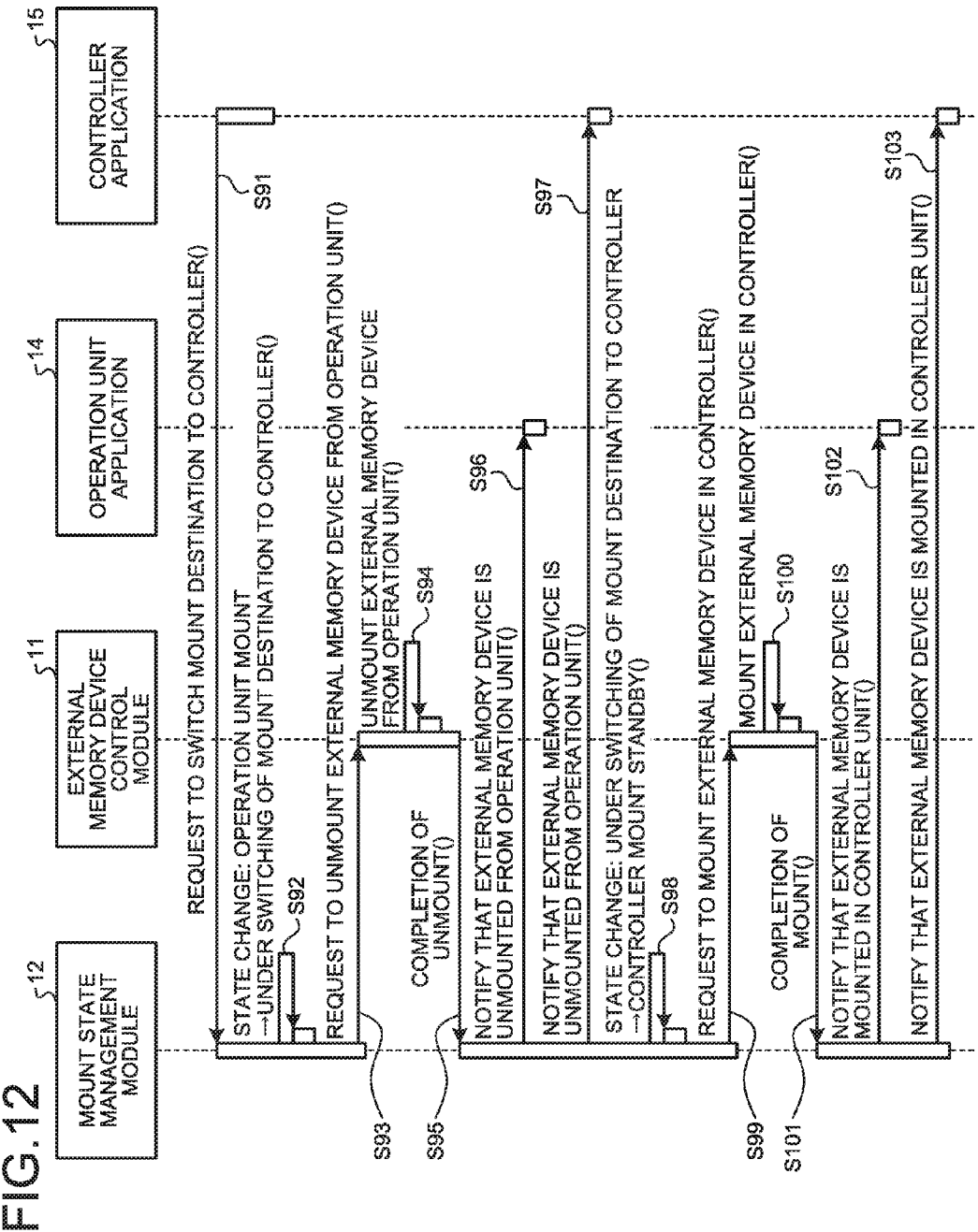
FIG. 12 is a sequence diagram illustrating the operation executed in response to a request to switch the mount destination to the controller unit while the external memory device is mounted in the operation unit.

Processing in response to Mount Destination Switching Request to Switch Mount Destination to Controller in "Operation Unit Mount" State Next, FIG. 12 is a sequence diagram illustrating a case where the external memory device 105 is mounted in the operation unit 102 (while the mount state management module 12 has the "operation unit mount" state), and a request to switch the mount destination to the controller unit 101 is issued. In FIG. 12, for example, if a switching request for switching the mount destination of the external memory device 105 to the controller unit 101 is issued from the controller application 15 to the mount state management module 12 (step S91), the mount state management module 12 transits to the "under switching of mount destination to controller" state ST6 (step S92). In addition, the mount state management module 12 requests the external memory device control module 11 to unmount the external memory device 105 from the operation unit 102 (step S93).

If the external memory device 105 is unmounted from the operation unit 102 (step S94), and this unmount process is completed, the external memory device control module 11 transmits an unmount completion notification to the mount state management module 12 (step S95). The mount state management module 12 notifies each of the applications 14 and 15 of a fact that the unmount process of the external memory device 105 is completed (steps S96 and S97).

As a result, the mount state management module 12 transits to the "controller mount standby" state ST7 (step S98) and issues a mount request for mounting the external memory device 105 in the controller unit 101 to the external memory device control module 11 (step S99). The external memory device control module 11 mounts the external memory device 105 in the controller unit 101 (step S100). If this mount process is completed, a mount completion notification is transmitted to the mount state management module 12 (step S101). In addition, the mount state management module 12 notifies each of the applications 14 and 15 of a fact that the external memory device 105 is mounted in the controller unit 101 (steps S102 and S103).

Figure 13:
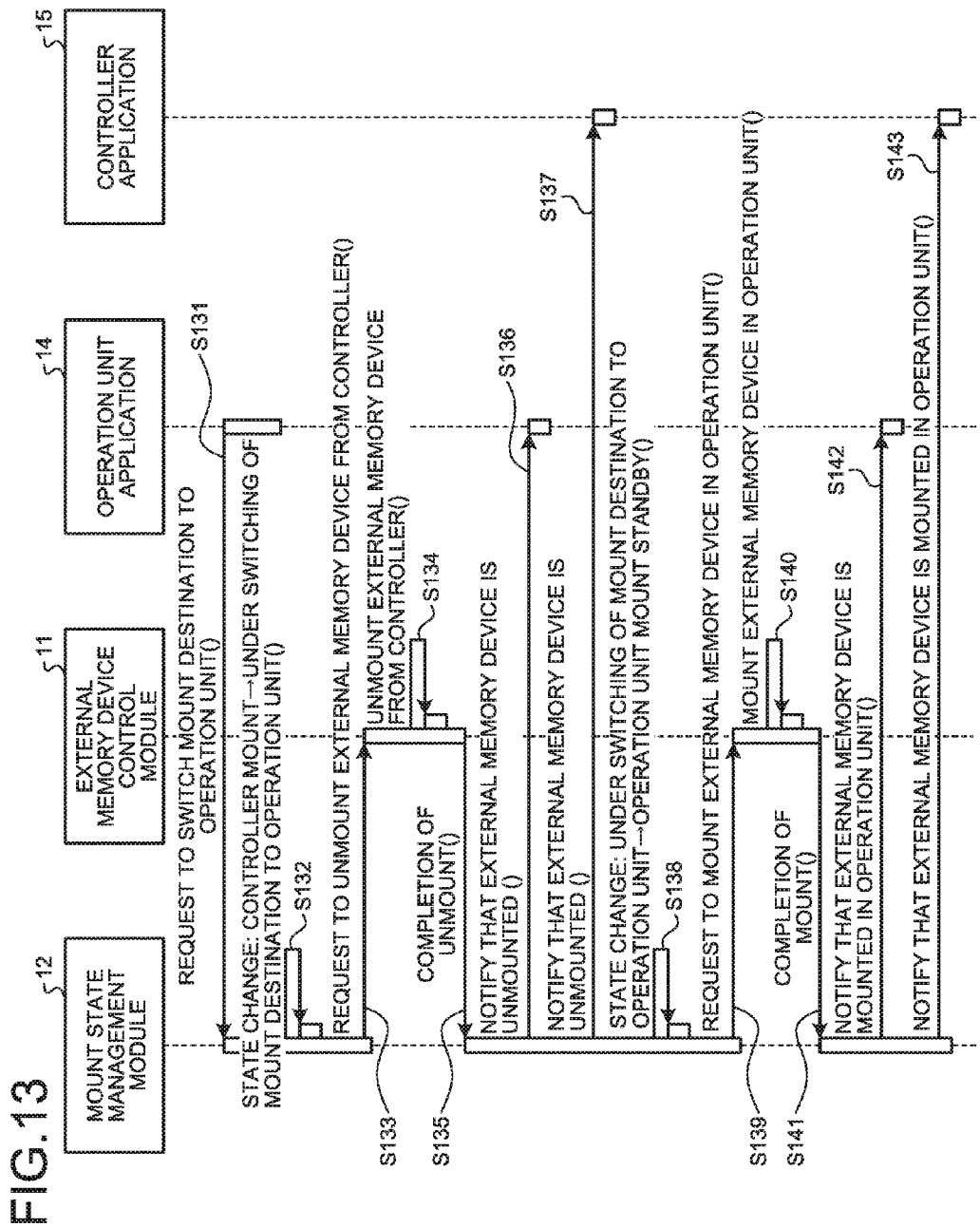
FIG. 13 is a sequence diagram illustrating the operation executed in response to a mount destination switching request for switching the mount destination of the external memory device to the operation unit while the external memory device is mounted in the controller unit.

Processing in Response to Mount Destination Switching Request for Switching Mount Destination to Operation Unit in "Controller Mount" State Next, FIG. 13 is a sequence diagram illustrating a case where a mount destination switching request for switching the mount destination of the external memory device 105 to the operation unit 102 is issued while the external memory device 105 is mounted in the controller unit 101 (in the "controller mount" state ST8).

In FIG. 13, for example, if a switching request for switching the mount destination of the external memory device 105 to the operation unit 102 is issued from the operation unit application 14 to the mount state management module 12 (step S131), the mount state management module 12 transits to the "under switching of mount destination to operation unit" state ST9 (step S132) and issues, to the external memory device control module 11, an unmount request for unmounting the external memory device 105 from the controller unit 101 (step S133).

As this unmount request is received, the external memory device control module 11 unmounts the external memory device 105 from the controller unit 101 (step S134). If this unmount process is completed, the external memory device control module 11 transmits an unmount completion notification to the mount state management module 12 (step S135).

As the unmount completion notification is received from the external memory device control module 11, the mount state management module 12 notifies each of the applications 14 and 15 of a fact that the external memory device 105 is unmounted (steps S136 and S137). As this notification is received by each of the applications 14 and 15, the mount state management module 12 transits to the "operation unit mount standby" state ST2 (step S138), and a mount request for mounting the external memory device 105 in the operation unit 102 is issued to the external memory device control module 11 (step S139).

As the mount request is received, the external memory device control module 11 performs the mount process by switching the mount destination of the external memory device 105 from the controller unit 101 to the operation unit 102 (step S140). As this mount process is completed, the external memory device control module 11 transmits a mount completion notification for notifying the mount state management module 12 of a fact that the mount process is completed (step S141). As the mount completion notification is received, the mount state management module 12 notifies each of the applications 14 and 15 of a fact that the external memory device 105 is mounted in the operation unit 102 (steps S142 and S143).

Effects of First Embodiment

As recognized from the aforementioned description, the MFP 100 according to the first embodiment can control the unmount target (the controller unit 101 or the operation unit 102) and the unmount timing depending on the mount state of the external memory device 105 in the controller unit 101 and the operation unit 102. For this reason, in a system in which the controller unit 101 and the operation unit 102 are independently operated, a user is allowed to remove the external memory device 105 at a desired timing. Therefore, it is possible to prevent a failure in storing data in the external memory device or a trouble of imperfect data that may be generated by removing the external memory device before the unmount process of the mounted external memory device is completed, and safely remove the external memory device 105.

Second Embodiment

Next, an MFP 100 according to a second embodiment will be described. Note that, in the description of the second embodiment, like reference numerals denote like steps as in the first embodiment, and they will not be described repeatedly. In the following description, only a difference between the first and second embodiments will be focused, and other similar parts will not be described repeatedly.

State Transition of Mount State Management Module

Figure 14:
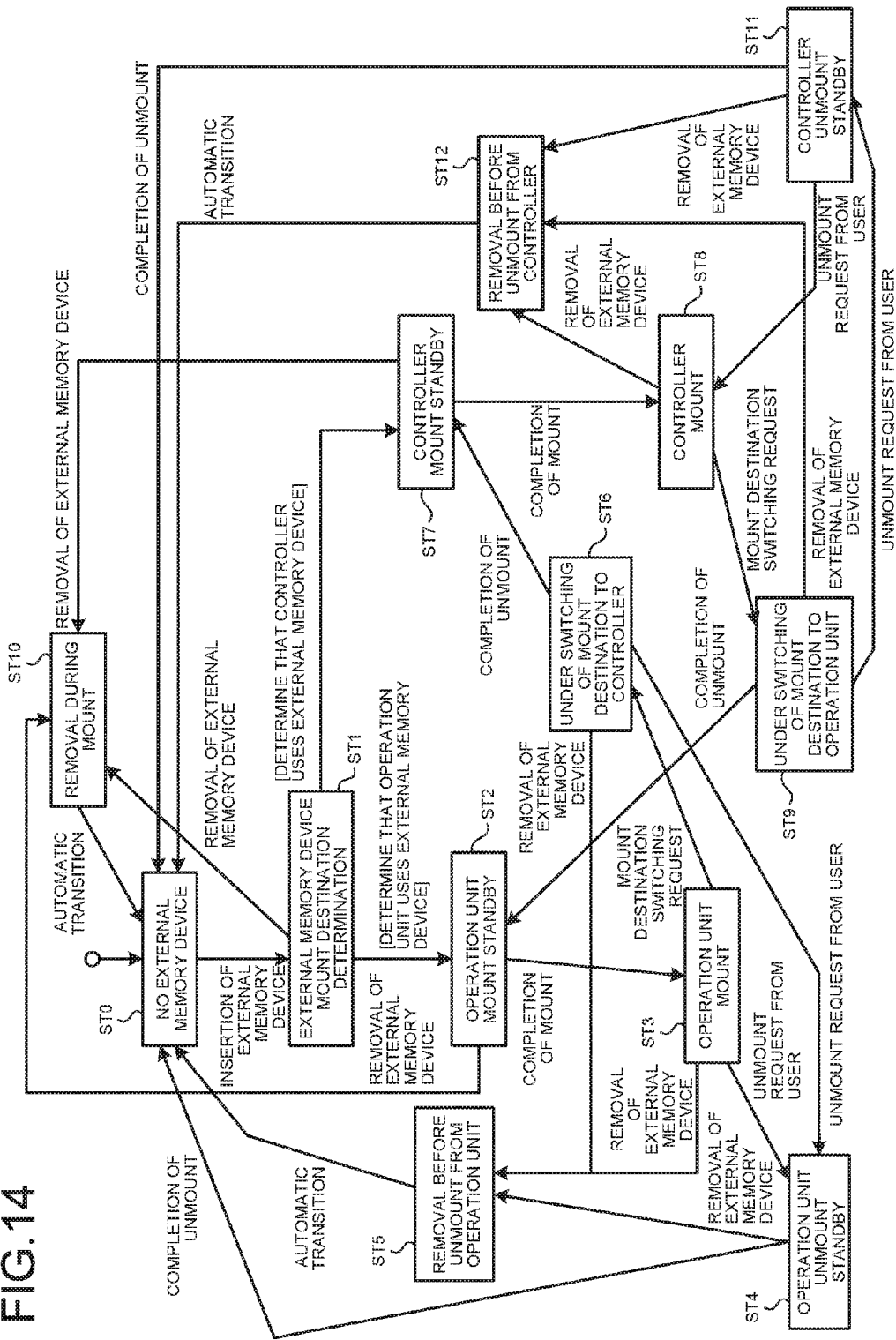
FIG. 14 is a state transition diagram of the mount state management module in an MFP according to a second embodiment.

FIG. 14 is a state transition diagram of the mount state management module 12 in the MFP 100 according to the second embodiment. The mount state management module 12 according to the second embodiment is different from the aforementioned mount state management module 12 of the first embodiment (FIG. 5) in that the mount state management module 12 transits to the unmount standby state when a user requests unmount during switching of the mount destination.

Specifically, the mount state management module 12 transits to the "operation unit unmount standby" state ST4 if a user makes an unmount request of the external memory device 105 in the "under switching of mount destination to controller" state ST6 in which the mount destination of the external memory device 105 is being switched from the operation unit 102 to the controller unit 101. In addition, the mount state management module 12 transits to the "controller unmount standby" state ST11 if a user makes an unmount request of the external memory device 105 in the "under switching of mount destination to operation unit" state ST9 in which the mount destination of the external memory device 105 is being switched from the controller unit 101 to the operation unit 102.

A specific example of the flow of the operation in the MFP 100 according to the second embodiment will now be described.

Processing in Response to Unmount Request from User while External Memory Device is Unmounted from Operation Unit by Issuing Mount Destination Switching Request to Controller During "Operation Unit Mount" State FIG. 15 is a sequence diagram illustrating a sequence performed in response to the unmount request from a user while the external memory device 105 is mounted in the operation unit 102 (the mount state management module 12 is in the "operation unit mount" state), and the external memory device 105 is unmounted from the operation unit 102 by issuing a mount destination switching request for switching the mount destination of the external memory device 105 to the controller unit 101.

In FIG. 15, for example, if a switching request for switching the mount destination of the external memory device 105 to the controller unit 101 is issued from the controller application 15 to the mount state management module 12 (step S111), the mount state management module 12 transits to the "under switching of mount destination to controller" state ST6 (step S112). In addition, the mount state management module 12 issues, to the external memory device control module 11, an unmount request for unmounting the external memory device 105 from the operation unit 102 (step S113).

The external memory device control module 11 unmounts the external memory device 105 from the operation unit 102 (step S115). It is assumed that the unmount request is issued from a user to the mount state management module 12 while the external memory device control module 11 performs the unmount process for unmounting the external memory device 105 from the operation unit 102 (step S114).

If there is the unmount request of the external memory device 105 from a user during such switching of the mount destination, the mount state management module 12 inquires of the external memory device control module 11 about a progress status of the switching of the mount destination. The external memory device control module 11 notifies the mount state management module 12 of the progress status. The mount state management module 12 selectively executes an operation for completing the unmount process of the external memory device 105 before completion of the mount destination switching and an operation for completing the unmount process of the external memory device 105 after completion of the mount destination switching on the basis of the notified progress status.

That is, the mount state management module 12 receives, from the external memory device control module 11, a reply, for example, indicating that the mount destination switching will be immediately completed, the mount state management module 12 transits to the "under switching of mount destination to controller" state ST6, to the "controller mount standby" state ST7, to the "controller mount" state ST8, and to the "controller unmount standby" state ST11, so that the unmount process of the external memory device 105 is completed.

In contrast, if a reply, for example, indicating that the mount destination switching is in an initial stage, and time is necessary to complete the switching is obtained from the external memory device control module 11, the mount state management module 12 transits from the "under switching of mount destination to controller" state ST6 to the "operation unit unmount standby" state ST4 (step S116). Note that the mount state management module 12 already issues the unmount request to the external memory device control module 11 when it transits to the "under switching of mount destination to operation unit" state ST9. For this reason, the mount state management module 12 does not issue the unmount request to the external memory device control module 11 as an entry process of the "operation unit unmount standby" state.

Then, the mount state management module 12 notifies each of the applications 14 and 15 of a fact that the mount destination switching is interrupted (steps S117 and S118). Each of the applications 14 and 15 may have a mount destination switching completion standby state for processing in the application side. For this reason, each of the applications 14 and 15 is notified of a fact that the mount destination switching is interrupted. As a result, the standby state of each of the applications 14 and 15 can be released. Therefore, it is possible to prevent a trouble that may be generated when each of the applications 14 and 15 holds the mount destination switching completion standby state although the mount destination switching is interrupted.

Then, the mount state management module 12 notifies the UI controller 13 of a fact that the state change of the external memory device 105 starts (step S119). The UI controller 13 performs control to blink the icon 1001 to notify a user that the unmount process is under execution (step S120). If the unmount process is completed, the external memory device control module 11 notifies the mount state management module 12 of the unmount completion (step S121). The subsequent processes are similar to those of step S96 and steps subsequent thereto of FIG. 12.

Processing in Response to Unmount Request from User while External Memory Device is Unmounted from Controller Unit by Requesting to Switch Mount Destination to Operation Unit in Controller Mount State Next, FIG. 16 is a sequence diagram illustrating a case where an unmount request is issued from a user while the external memory device 105 is mounted in the controller unit 101 (the mount state management module 12 has the "controller mount" state), and the external memory device 105 is being unmounted from the controller unit 101 by issuing a mount destination switching request for switching the mount destination of the external memory device 105 to the operation unit 102.

In FIG. 16, for example, if a switching request for switching the mount destination of the external memory device 105 to the operation unit 102 is issued from the operation unit application 14 to the mount state management module 12 (step S151), the mount state management module 12 transits to the "under switching of mount destination to operation unit" state ST9 (step S152). In addition, the mount state management module 12 issues, to the external memory device control module 11, an unmount request for unmounting the external memory device 105 from the controller unit 101 (step S153).

The external memory device control module 11 performs the unmount process for unmounting the external memory device 105 from the controller unit 101 (step S154). It is assumed that an unmount request is issued from a user to the mount state management module 12 while the external memory device control module 11 performs the unmount process for unmounting the external memory device 105 from the controller unit 101 (step S155).

If there is an unmount request of the external memory device 105 from a user during switching of the mount destination, the mount state management module 12 inquires of the external memory device control module 11 about a progress status of the mount destination switching. The external memory device control module 11 notifies the mount state management module 12 of the progress status. The mount state management module 12 selectively executes an operation for completing the unmount process of the external memory device 105 before completion of the mount destination switching or an operation for completing the unmount process of the external memory device 105 after completion of the mount destination switching on the basis of the notified progress status.

That is, if the mount state management module 12 receives, from the external memory device control module 11, for example, a reply indicating that the mount destination switching is immediately completed, the mount state management module 12 sequentially transits to the "under switching of mount destination to operation unit" state ST9, to the "operation unit mount standby" state ST2, to the "operation unit mount" state ST3, and to the "operation unit unmount standby" state ST4 and then completes the unmount process of the external memory device 105.

In contrast, for example, if a reply indicating that the mount destination switching is an initial stage, and time is necessary to complete the switching is received from the external memory device control module 11, the mount state management module 12 transits from the "under switching of mount destination to operation unit" state ST9 to the "controller unmount standby" state ST11 (step S156). Note that the unmount request is already issued to the external memory device control module 11 when the mount state management module 12 transits to the "under switching of mount destination to controller" state ST6. Therefore, the mount state management module 12 does not issue the unmount request to the external memory device control module 11 as an entry process of the "controller unmount standby" state.

Then, the mount state management module 12 notifies each of the applications 14 and 15 of a fact that the mount destination switching is interrupted (steps S157 and S158). Each of the applications 14 and 15 may have a mount destination switching completion standby state for processing in the application side. For this reason, the mount state management module 12 notifies each of the applications 14 and 15 of a fact that the mount destination switching is interrupted. As a result, the standby state of each of the applications 14 and 15 can be released. Therefore, it is possible to prevent a trouble that may be generated when each of the applications 14 and 15 holds the mount destination switching completion standby state although the mount destination switching is interrupted.

Then, the mount state management module 12 notifies the UI controller 13 of a fact that the state change of the external memory device 105 starts (step S159). The UI controller 13 notifies a user of a fact that the unmount process is under execution by blinking the icon 1001 (step S160). If the unmount process is completed, the external memory device control module 11 notifies the mount state management module 12 of a fact that the unmount process is completed (step S161). The subsequent processes are similar to those of step S136 and steps subsequent thereto of FIG. 13.

Effects of Second Embodiment

As apparent from the aforementioned description, the MFP 100 according to the second embodiment can obtain the following effects in addition to those of the first embodiment described above.

If a user requests the unmount process of the external memory device 105 during the mount destination switching of the external memory device 105, the mount state management module 12 transits to the unmount standby state ST4 or ST11 of the external memory device 105. As a result, the unmount sequence can be executed without waiting for the mount destination switching completion. Therefore, it is possible to improve response to the unmount request from a user.

Each of the applications 14 and 15 may have the mount destination switching completion standby state for processing in the application side. For this reason, the mount state management module 12 notifies each of the applications 14 and 15 of a fact that the mount destination switching is interrupted. As a result, the standby state of each of the applications 14 and 15 can be released. Therefore, it is possible to prevent a trouble that may be generated when each of the applications 14 and 15 holds the mount destination switching completion standby state although the mount destination switching is interrupted.

That is, various modifications or changes may be possible for the aforementioned embodiments in the scope of the present invention. The aforementioned embodiments of the present invention may also be applied to other forms without departing from the scope and spirit of the present invention as contained in the appended claims and equivalents thereof.

The present invention may be embodied by programming a conventional computer to execute the processes described in this specification on the basis of information processing technologies relating to a computer architecture or computational processing. A person skilled in the art pertinent to a software technology would create software for programming a computer to execute the processes according to the present invention by reading the description provided in this specification.

A person skilled in the art pertinent to information processing technologies would embody the present invention in an application specific integrated circuit (ASIC) or a conventional integrated circuit module.

Each of the functions described above in the embodiments may be implemented in a single or a plurality of processing circuits. Herein, a "processing circuit" refers to hardware such as a processor, an ASIC, or a circuit module designed to execute each function using software.

According to the present invention, it is possible to perform the unmount process at the timing that an external memory device shared between a plurality of working units is removed. For this reason, it is possible to safely remove the external memory device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
an operation unit using a first operating system;
a controller unit using a second operating system; and
an external device interface configured to be communicatively coupled to an external memory device; and
a management unit configured to
manage a plurality of mount states of the external memory device including a mounted state and unmounted state, the mounted state being a state in which the external memory device is mounted to a mount destination, the mount destination including one of the operation unit or the controller unit, the unmounted state being a state in which the mounted state is released,
switch the mount destination of the external memory device between the operation unit and the controller unit, and
execute an unmount process depending on a current mount state of the plurality of mount states when an unmount request of the external memory device is issued.

2. The information processing apparatus according to claim 1, further comprising a user interface controller configured to
display one or more indications on a display unit provided in the operation unit, the one or more indications including
a first indication for indicating that the external memory device is mounted in the operation unit or the controller unit,
a second indication for indicating that the external memory device is under a mount process in which the external memory device is being mounted in the operation unit or the controller unit, and
a third indication for indicating that the external memory device is under an unmount process.

3. The information processing apparatus according to claim 2, wherein the first indication includes continuous illumination of an icon, the second indication and the third indication include blinking of the icon.

4. The information processing apparatus according to claim 3, wherein a user may initiate the unmount process by selecting the icon.

5. The information processing apparatus according to claim 3, wherein the first indication is displayed during the switch of the mount destination of the external memory device.

6. The information processing apparatus according to claim 1, wherein the management unit is further configured to perform an unmount process after the switch of the mount destination of the external memory device is completed if a request to unmount the external memory device is received during the switch.

7. The information processing apparatus according to claim 1, wherein the management unit is further configured to selectively complete the unmount process before or after the switch of the mount destination of the external memory device if a request to unmount the external memory device is received during the switch, depending on a progress status of the switch.

8. The information processing apparatus according to claim 7, wherein the management unit is further configured to notify an application communicating with the external memory device that the unmount process is completed before completion of the switch if completing the unmount process before the switch is selected.

9. The information processing apparatus according to claim 1, wherein the first operating system is a different version of operating system from the second operating system.

10. The information processing apparatus according to claim 1, wherein the operation unit is one of a smart phone or a tablet computer.

11. The information processing apparatus according to claim 1, wherein the operation unit is removably coupled to the information processing apparatus.

12. The information processing apparatus according to claim 1, wherein the mounted state includes the external memory device being exclusively mounted to one of the operation unit or the controller unit at a time.

13. The information processing apparatus according to claim 1, wherein the plurality of mount states include a mount standby state in which a mount process is performed, and an unmount standby state in which the unmount process is performed.

14. The information processing apparatus according to claim 13, further comprising a user interface controller configured to display a warning message to a user if the external memory device is physically removed from the external device interface during the mounted state, the unmount standby state and while the mounted state of the external memory device is switched between the operation unit and the controller unit.

15. The information processing apparatus according to claim 1, further comprising a user interface controller configured to display a user interface to a user that permits the user to initiate the unmount process by interacting with the user interface.

16. The information processing apparatus according to claim 1, wherein the external device interface is within the operation unit.

17. The information processing apparatus according to claim 1, wherein
the operation unit includes a first application program and the controller unit includes a second application program, and
the management unit is further configured to switch the mount destination of the external memory device based on a request from the first application program or the second application program.

18. The information processing apparatus according to claim 17, further comprising a user interface controller configured to display an output of an active application, of the first application program or the second application program, based on the mount destination.

19. An information processing method of an image processing device, the method comprising:
managing a plurality of mount states of an external memory device including a mounted state and unmounted state, the mounted state being a state in which the external memory device is mounted to a mount destination, the mount destination including one of a first operating system or a second operating system, the first operating system being executed by at least one first processor, the second operating system being executed by at least one second processor, and the unmounted state being a state in which the mounted state is released; and
switching the mount destination of the external memory device between the first operating system and the second operating system,
wherein, the managing includes executing an unmount process depending on a current mount state of the plurality of mount states when there is a request for unmounting the external memory device.

20. An information processing apparatus comprising:
an external device interface configured to be communicatively coupled to an external memory device; and
at least one first processor configured to
execute a first operating system, and
execute other programmed instructions stored in a memory to
manage a plurality of mount states of the external memory device including a mounted state and unmounted state, the mount state being a state in which the external memory device is mounted to a mount destination, the mount destination including one of the first operating system or a second operating system, the second operating system being executed by at least one second processor, the unmount state being a state in which the mounted state is released,
switch the mount destination of the external memory device between the first operating system and the second operating system, and
execute an unmount process depending on a current mount state of the plurality of mount states when an unmount request of the external memory device is issued.

* * * * *